US007021556B2

(12) United States Patent
Muir et al.

(10) Patent No.: US 7,021,556 B2
(45) Date of Patent: Apr. 4, 2006

(54) FOUNTAIN THAT FLOWS WITH FLUIDIC MATERIAL

(75) Inventors: Richard B. Muir, San Diego, CA (US); William F. Polley, Marco Island, FL (US); Devan B. Muir, San Diego, CA (US); Wu C. Liang, Taoyuan (TW)

(73) Assignee: Sephra Fountains, LLC, San Diego, CA (US)

( * ) Notice: Subject to any disclaimer, the term of this patent is extended or adjusted under 35 U.S.C. 154(b) by 61 days.

(21) Appl. No.: 10/698,283

(22) Filed: Oct. 31, 2003

(65) Prior Publication Data

US 2005/0092852 A1    May 5, 2005

(51) Int. Cl.
    *E03B 9/20* (2006.01)
(52) U.S. Cl. .......................... 239/16; 239/20; 239/722; 239/28; 99/483; 99/452
(58) Field of Classification Search ................ 239/722, 239/16, 20, 28; 99/483, 452
    See application file for complete search history.

(56) References Cited

U.S. PATENT DOCUMENTS

| 1,804,519 A | 5/1931 | Smith et al. |
| 4,630,771 A | 12/1986 | Hall et al. |

FOREIGN PATENT DOCUMENTS

| EP | 0 410 381 A | 1/1991 |
| FR | 929 856 A | 1/1948 |
| FR | 2 768 423 A | 3/1999 |
| GB | 945 906 A | 1/1964 |
| GB | 2 346 658 A | 8/2000 |

OTHER PUBLICATIONS

The American Chocolate Fountain product brochure, Buffet Enhancements International, Jan. 1, 2005, all.*
Buffet Enhancements International Product Catalog No. 105, Jan. 1, 2005 p. 1-4.*

(Continued)

*Primary Examiner*—David A. Scherbel
*Assistant Examiner*—James S. Hogan
(74) *Attorney, Agent, or Firm*—Knobbe, Martens, Olson & Bear, LLP (57) ABSTRACT

A fountain for heating and distributing fluidic material is manufactured using various processes and materials so that the fountain is more easily cleaned and sanitized, has improved performance, and is easier to assemble. In one embodiment, the chocolate fountain includes a heating element encased in an aluminum enclosure. A basin containing chocolate is heated by contact with the aluminum enclosure. Because the aluminum enclosure has a relatively high thermal conductivity, the basin is heating substantially uniformly, thus reducing the occurrence of hot spots. Additionally, a plastic auger having a spiral flight rotates and lifts the melted chocolate upward to a top end of cylinder that houses the auger. The use of a plastic auger advantageously eliminates welding artifacts on the auger, such as burrs and pits, on which melted chocolate may accumulate. Accordingly, the plastic auger is easy to clean. A smaller chocolate fountain that may advantageously be more suitable for home use is also described herein.

37 Claims, 9 Drawing Sheets

OTHER PUBLICATIONS

Documents received from Buffet Enhancements, P.O. Box 1000, Point Clear, AL 36564.

Documents received from Protections Equinox, 4480, Cote-de-Liesse, suite 224, Montreal, Canada H4N 2R1.

* cited by examiner

FIG. 1

*(PRIOR ART)*

FOUNTAIN THAT FLOWS WITH FLUIDIC MATERIAL

BACKGROUND OF THE INVENTION

1. Field of the Invention

The invention relates generally to a food dispensing apparatus, and more particularly to a fountain that flows with a fluidic material.

2. Description of the Related Art

Fondue machines typically include a bowl shaped container for holding and heating chocolate. The container is heated by a heating element to melt the chocolate. Fruit, or other food items, may then be dipped into the container of the fondue machine.

Figure 1:
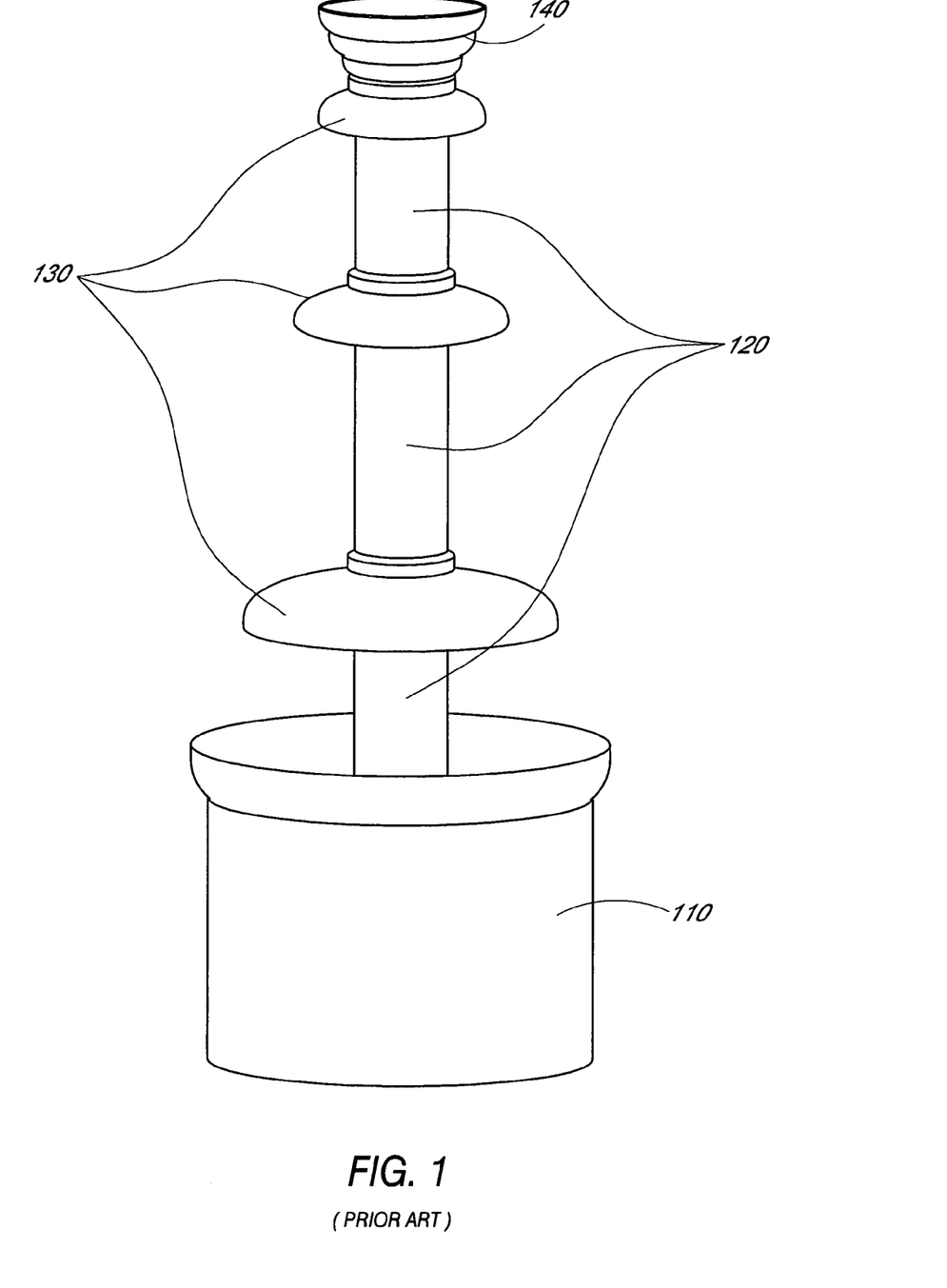
FIG. 1 is a side elevation view of a prior art chocolate fountain.

In recent years, fondue machines have taken on alternate configurations. For example, Design & Réalisation Inc. in Montreal, Canada markets a chocolate fountain that moves melted chocolate so that it flows over a number of tiers like a fountain. FIG. 1 is a diagram illustrating a prior art chocolate fountain 100, such as the fountain marketed by Design & Réalisation Inc. As shown in FIG. 1, the chocolate fountain 100 includes a container 110 configured to hold and melt chocolate. A hollow barrel 120 is mounted in the center of the container 110 and provides a pathway for melted chocolate to be moved upward, through its hollow center, to the top of the fountain. An auger including a spiral flight extending around the length of the auger is mounted within the hollow barrel 120. The auger is rotated in order to lift the melted chocolate upward in the hollow barrel 120. On the top of the barrel 120 is a crown 140 that fills with chocolate that flows out of the barrel 120. When the crown 140 is full of melted chocolate, the chocolate begins to fall over the edges of the crown 140. Attached to the barrel 120 are tiers 130 which vary in size. As the chocolate flows downwardly from the crown 140, the chocolate flows over each of the tiers 130, thus forming a multi-level chocolate waterfall. The chocolate fountain 100 also includes a heating element that is placed below the container 110.

One disadvantage of the chocolate fountain 100 is the difficulty in attaching the tiers 130 in the appropriate location. For example, there is no mechanism to easily determine where each of the tiers 130 should be attached to the barrel 120. Additionally, there is no mechanism for ensuring that the attached tiers 130 are level so that the melted chocolate flows evenly around the perimeter of each tier 130. Furthermore, attachment of tiers 130 in the prior art requires the use of tools, such as a hex wrench, in order to tighten a fastener which secures the tiers 130 to the barrel 120.

Another disadvantage of the chocolate fountain 100 is the difficulty experienced in cleaning the various pieces of the fountain 100. For example, the tiers 130 and crown 149 are typically manufactured by welding multiple pieces of metal together, thus leaving burrs, pits, and sharp edges. Because melted chocolate tends to accumulate on any non-smooth surfaces, cleaning tiers 130 that include burrs, or other non-smooth welding artifacts, is increasingly difficult. Furthermore, accumulation of chocolate in pits, or other non-smooth surfaces, can be unsanitary. Additionally, the sharp edges created by welding may be dangerous to users of the fountain 100.

A further disadvantage of the chocolate fountain 100 is the uneven heating of the chocolate in the container 110. In particular, the container 110 contains hot spots over the areas that are in direct contact with the heating element. Adding to the problem of uneven heating, the container 110 of the chocolate fountain 100 is not configured to urge the chocolate towards a center of the container 110. Accordingly, melted chocolate does not pool in the center of the container 110, but instead spreads on the surface of the unevenly heated container 110. Additionally, the outer perimeter of the container 110 typically becomes hot when the heating element is active, thus presenting the possibility of harming a user that touches the container. Also, when users of the chocolate fountain 100 dip food items into the flowing chocolate, a portion of the melted chocolate typically falls outside of the container 110 due to the small size of the container 110.

Another disadvantage of the chocolate fountain 100 is that as the auger lifts the melted chocolate up the barrel 120, the melted chocolate comes in contact with a central shaft of the auger which requires additional cleaning. Also, because the auger and the barrel 120 are both made of metal, the melted chocolate may be contaminated with metal filings caused by the contact of the rotating auger with the barrel 120. In addition, the friction of the metal auger with the metal barrel 120 may having a sharpening effect on the edges of the spiral flight, causing the spiral flight to become sharp and dangerous to the user. Furthermore, because the auger is made of metal, with the spiral flight welded onto a rod, there are typically burrs, pits, and uneven surfaces that increase the difficulty of cleaning the auger and promote an unsanitary chocolate fountain 100.

Accordingly, what is needed is a chocolate fountain configured for easy attachment of tiers at predetermined locations, such as by including a mechanism to easily determine where each of the tiers should be attached to the shaft. Additionally, what is needed is a mechanism for ensuring that the attached tiers are level. Furthermore, a chocolate fountain that allows manual attachment of tiers is desired. Also, a chocolate fountain that is easier to clean is needed. A chocolate fountain that evenly heats chocolate is also desired. In addition, a chocolate fountain having a container with an outer perimeter that does not get hot when the heating element is active is desired. A chocolate fountain having a container that is angled to direct the melted chocolate to the center of the container to reduce pooling of stagnant chocolate is also desired. Furthermore, a chocolate fountain that reduces the portion of the melted chocolate that falls outside of the fountain when users dip food items into the flowing chocolate is desired. Moreover, a chocolate fountain that reduces the occurrence of contaminants, such as metal filings, in the chocolate is needed.

SUMMARY OF THE INVENTION

In one embodiment, an apparatus comprises a basin having a bottom surface and an outer side surrounding the bottom surface, the basin being configured to contain a fluidic material within the basin, a high thermal conductivity enclosure substantially encasing a heating element, wherein the enclosure is in contact with the bottom surface of the basin and is configured to substantially evenly heat the bottom surface of the basin, a cylinder having a top end and a bottom end, wherein the bottom end is attached to the bottom surface of the basin so that the cylinder extends substantially perpendicular from the bottom surface, an auger having a spiral flight comprising a plurality of revolutions protruding along a length of the auger, wherein the auger is disposed within the cylinder, a tier removably attached to the cylinder and having an upper surface and a lower surface, and a source of rotation coupled to the auger and configured to rotate the auger inside the cylinder, wherein the spiral flight supports the fluidic material as the auger rotates, moving the fluidic material upwardly to the top end of the cylinder.

The fluidic material may flow from the top end of the cylinder onto the upper surface of the tier and flows downwardly to the basin. The tier may be bowl shaped so that an outer perimeter of the tier is curved towards the basin. The high thermal conductivity enclosure may comprise aluminum. The revolutions of the spiral flight may have a pitch of greater than about 55 mm. The revolutions of the spiral flight may have a pitch of less than about 24 mm. The cylinder may comprise a score mark at a predetermined height of the cylinder and extending around an outer perimeter of the cylinder, and wherein the tier is attached to the cylinder at the predetermined height of the cylinder. The score mark may be of a sufficient depth so that the tier engages the score mark, and wherein the engagement of the tier with the score mark allows the attachment of the tier on the cylinder so that the fluidic material flows uniformly on a top surface of the tier. The fluidic material may comprise melted chocolate. The source of rotation may comprise an electric motor. The electric motor may be mounted so that a drive shaft rotates parallel to the auger and wherein a belt is coupled to the drive shaft and the auger so that the drive shaft rotates the auger. The electric motor may be mounted so that a drive shaft directly engages the auger so that the drive shaft rotates the auger. The tier may comprise a collar including a step on a top surface of the collar and a body having an aperture, wherein the step of the collar is inserted into the aperture and the step is deformed so that the collar is attached to the body. On the lower surface of the tier, a spot weld may be applied to a junction of the collar and the body. The tier may comprise a single structure. The tier may be removably attached to the cylinder using a hex bolt tightened through a threaded hole in the collar. The tier may comprise a collar portion, a body portion, and a notch between the junction of the collar portion and the body portion, and wherein the cylinder comprises a step of sufficient size so that the step engages the notch and supports the tier on the cylinder. The auger may comprise a FDA plastic material. The auger may comprise a non-metallic material. The auger may be fabricated by insert molding. An angle between the bottom surface of the basin and the outer perimeter may be less than or equal to about 14 degrees. An angle between the bottom surface of the basin and the outer side may be greater than or equal to about 16 degrees. A diameter of the outer perimeter may be greater than or equal to about 475 mm. A diameter of the outer perimeter may be less than or equal to about 350 mm. A crown may be mounted on the top end of the cylinder, wherein the fluidic material flows from the top end of the cylinder onto the crown and then onto the upper surface of the tier. A surface of the crown on which the fluidic material flows may be substantially free of welding artifacts. The crown may be fabricated by metal casting. The crown may be fabricated by plastic molding. The crown may comprise a single structure. The crown may be mounted on the top end of the cylinder so that a portion of the crown extends below the top end of the cylinder, and wherein the crown is configured so that the fluidic material does not contact the portion of the crown that extends below the top end of the cylinder. The apparatus may further comprise a second tier mounted on the cylinder, wherein the fluidic material flows on an upper surface of the second tier. The apparatus may further comprise a third tier mounted on the cylinder, wherein the fluidic material flows on an upper surface of the third tier. The apparatus may further comprise a handle mounted on the basin. The auger, the crown, and the tier may be free of welding artifacts. The tier may be free of welding artifacts on the upper surface.

In another embodiment, a method of manufacturing an apparatus for circulating melted food items comprises molding a plastic auger with a spiral flight, metal casting a crown, providing a structure having a central aperture, inserting a collar in the central aperture of the structure, and flanging the collar so that the collar is attached to the structure. The structure may be concave and the central aperture is circular. The method may further comprise manufacturing a cylinder having a score mark at a predetermined height of the cylinder and extending around an outer perimeter of the cylinder, wherein the collar is attached to the cylinder at the predetermined height of the cylinder. The auger, the crown, and the collar flanged to the structure may be substantially free of welding artifacts.

In another embodiment, a method of assembling an apparatus for circulating melted food items comprises mounting a cylinder to a basin so that the cylinder extends substantially perpendicular from a bottom surface of the basin, placing a tier having a circular aperture on the cylinder so that a top end of the cylinder is inside the circular aperture, and moving the tier towards a bottom end of the cylinder until a locking mechanism stabilizes the tier at a predetermined location and the tier becomes substantially manually unmovable. The cylinder may be tapered so that a diameter of the top end of the cylinder is smaller than a diameter of a bottom end of the cylinder. The tier may comprise a notch configured to engage a step formed on the outer surface of the cylinder at a predetermined location, the method further comprising engaging the notch with the step so that the tier is supported on the cylinder and is not manually movable towards the bottom end of the cylinder.

In another embodiment, an apparatus for uniformly heating a material comprises a basin configured to contain the material, a cylinder attached substantially perpendicular to the basin and configured to contain the material, and one or more flexible heating members, wherein the one or more flexible heating members are coupled to the basin so that a surface of the basin is substantially uniformly heated. The one or more flexible heating members may be encapsulated in a heat conductive material. The heat conductive material is a carbon filled rubber.

In another embodiment, an apparatus for uniformly heating a material comprises a basin configured to contain the material, a cylinder attached substantially perpendicular to the basin and configured to contain the material, and a high thermal conductivity enclosure substantially encasing a heating element, wherein the enclosure is in contact with the basin and is configured to substantially evenly heat the basin.

In another embodiment, an apparatus comprises means for containing a fluidic material, means for substantially evenly heating a surface of the containing means, and means for moving the fluidic material, the moving means having a top end and a bottom end, wherein the bottom end is attached to a bottom surface of the containing means so that the moving means extends substantially perpendicular from the containing means, and wherein the fluidic material travels upwardly in the moving means to the top end of the moving means and then downwardly to the containing means.

In another embodiment, an apparatus comprises a basin having a bottom surface and an outer side surrounding the bottom surface, the basin being configured to contain a fluidic material within the basin, a cylinder having a top end and a bottom end, wherein the bottom end is removably attached to the bottom surface of the basin so that the cylinder extends substantially perpendicular from the bottom surface, and a high thermal conductivity enclosure substantially encasing a heating element, wherein the enclosure is in contact with the bottom surface of the basin and is configured to substantially evenly heat the bottom surface of the basin. The high thermal conductivity enclosure may comprise aluminum.

In another embodiment, a fountain comprises a basin configured to contain a fluidic material, a housing removably attached substantially perpendicular to the basin and configured to contain the fluidic material, and a tier removably attached to the cylinder, wherein the tier comprises a collar including a step on a top surface of the collar and a body having an aperture, wherein the step of the collar is inserted into the aperture and the step is deformed so that the collar is attached to the body.

In another embodiment, an apparatus comprises means for heating a fluidic material, means, at least partially extending within the fluidic material, for moving a portion of the fluidic material upwardly within a contained area, wherein the means for moving includes means for carrying the fluidic material upwardly, and means for manually attaching one or more tiers to the contained area so that the fluidic material flows substantially evenly on a surface of the one or more tiers.

In another embodiment, a fountain comprises a basin configured to contain a fluidic material, wherein a diameter of an outer perimeter of the basin is greater than or equal to about 475 mm, a housing removably attached substantially perpendicular to the basin and configured to contain the fluidic material, and a moving means configured to move the fluidic material within the basin upwardly within the housing, wherein substantially all of the fluidic material returns to the basin, via a path outside of the housing, after the moving means moves the fluidic material to a top of the housing.

In another embodiment, a fountain comprises a basin configured to contain a fluidic material, a housing removably attached substantially perpendicular to the basin and configured to contain the fluidic material, and a plastic auger configured to move the fluidic material within the basin upwardly within the housing, wherein substantially all of the fluidic material returns to the basin, via a path outside of the housing, after the plastic auger moves the fluidic material to a top of the housing.

In another embodiment, a fountain comprises a basin configured to contain a fluidic material, a housing removably attached substantially perpendicular to the basin and configured to contain the fluidic material, and a single structure crown mounted on the top end of the housing, wherein the fluidic material travels upwardly to the top end of the housing, onto the crown, and then downwardly towards the basin. The crown may be fabricated by metal casting. The crown may be fabricated by plastic molding.

DETAILED DESCRIPTION OF PREFERRED EMBODIMENTS

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 2:
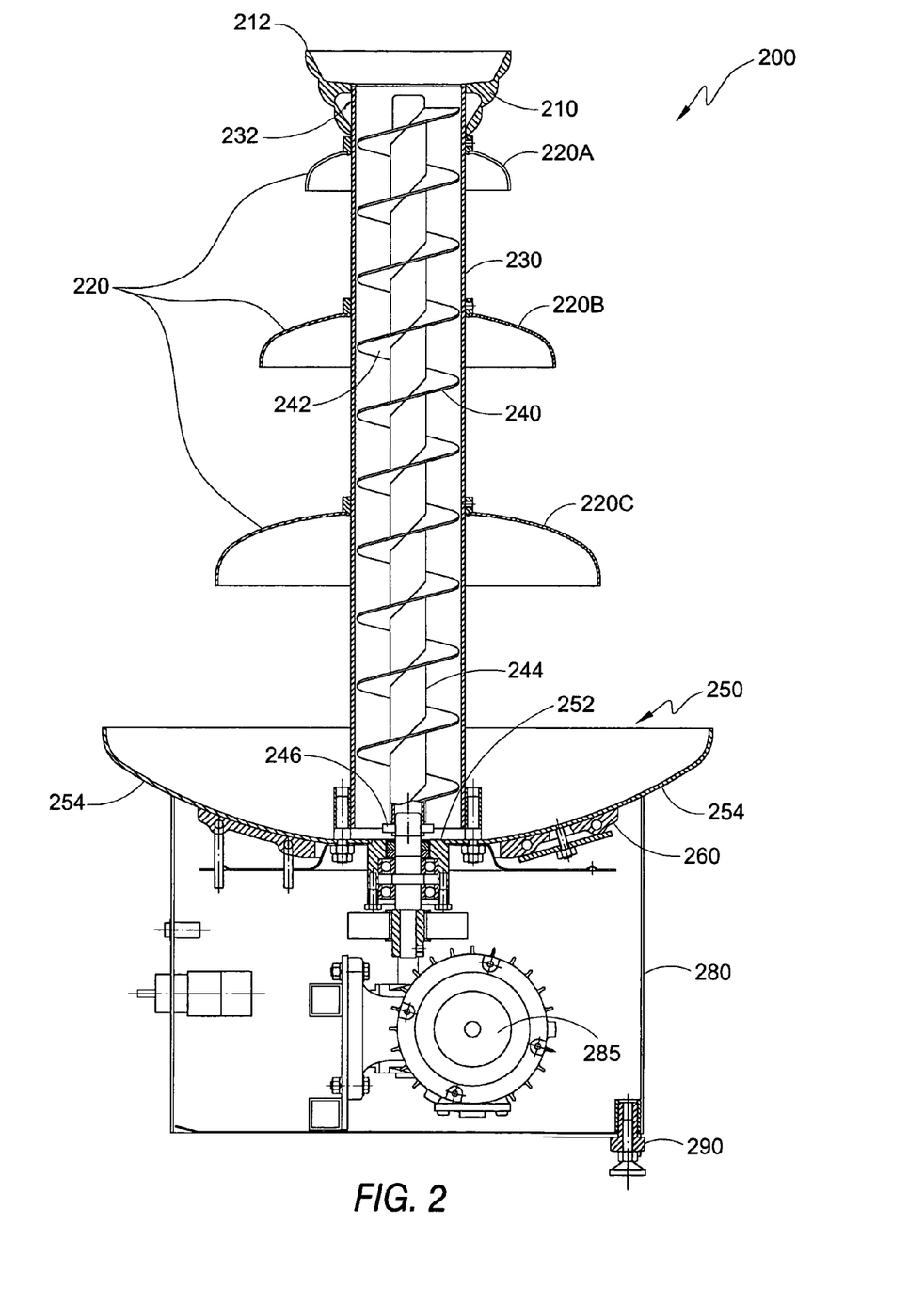
FIG. 2 is a cross-sectional side view of a chocolate fountain having features that reduce cleaning time and improve performance

FIG. 2 is a cross-sectional side view of an improved fountain 200 having features that address the disadvantages discussed above with respect to the prior art. The improved fountain 200 advantageously has reduced cleaning requirements, improved performance, and simpler set-up. In one embodiment, the fountain 200 flows with melted chocolate and is therefore referred to as a chocolate fountain 200. However, while reference is made herein to the use of chocolate in the fountain 200, the systems and methods described herein are not limited to the use of chocolate. Accordingly, references made herein to a chocolate fountain do not limit the fountain to use with chocolate. In particular, any other fluidic material which a user wishes to circulate through the fountain 200 may be used instead of chocolate. For example, other confectionery items, such as caramel, toffee, taffy, or marshmallows; dairy products, such as cheese; or flavorings, such as mint or fruit, may be used in the fountain 200. Additionally, different varieties of chocolate, such as white chocolate, dark chocolate, or milk chocolate, may be used in the fountain 200. Furthermore, any combination of food items, such as a combination of chocolate and caramel, for example, may be used in the fountain 200.

As shown in FIG. 2, the chocolate fountain 200 comprises a housing 280, upon which a basin 250 is mounted. The housing 280 houses a motor 285 and heating elements 260. The motor 285 may be any type of motor suitable to provide a rotary force. As described in further detail below, the heating element 260 is encased in an aluminum enclosure in order to more uniformly distribute the heat throughout the basin 250. Accordingly, the chocolate is uniformly heated and melted in the basin 250 due to the uniform heating of the basin 250 by the heating element 260. An auger 240 having a spiral flight 242 surrounding a central shaft 244 of the auger 240 is coupled to the bottom surface 252 of the basin 250. The motor 285 engages the auger 240 and applies a rotational force causing the auger 240 to rotate and thereby to lift melted chocolate, for example, upward inside the cylinder 230, the chocolate traveling upwardly upon the top surface of the spiral flight 242. A crown 210 is mounted on a top 232 of the cylinder 230 and provides an exit location for the melted chocolate that has been lifted through the cylinder 230, wherein the melted chocolate flows over a top circumference 212 of the crown 210. In the embodiment of FIG. 2, an adjustment nut 290 is connected to the housing 280 and allows adjustment of the height of the foot so that the fountain 200 may be leveled.

In the embodiment of FIG. 2, the chocolate fountain 200 includes three tiers 220 that are each attached to the cylinder 230. In other embodiments, any number of tiers 220, such as 1, 2, 4, 5, or 6, for example, may be attached to the cylinder 230. A top surface of each of the tiers 220 comes in contact with the melted chocolate that flows off the top circumference 212 of the crown 210 so that the melted chocolate flows over each of the tiers 220 and returns to the basin 250. In this way, the chocolate continues to circulate through the chocolate fountain 200 and creates levels of chocolate flowing like a waterfall. Certain aspects of the chocolate fountain 200 will now be described in further detail.

In one embodiment, food items, such as fruit, are dipped into the chocolate flowing downward from the mounted tiers 220 of the fountain 200. When the food items are removed from the flowing chocolate, and before the chocolate hardens on the food items, drops of chocolate may drip from the food item. If chocolate drips outside of the fountain 200, cleaning the outside surface of the fountain and/or the surface on which the fountain 200 sets may be required. Additionally, chocolate dripped outside of the fountain 200 is, in most circumstances, contaminated and unusable by the chocolate fountain 200. Thus, dripping chocolate is preferably caught by the basin 250 so that it may be recirculated through the chocolate fountain 200. In an advantageous embodiment, the diameter of the basin 250 is sufficiently large to capture a significant portion of the dripping chocolate. In one embodiment, the diameter of the basin 250 is greater than or equal to about 400 mm. In another embodiment, the diameter of the basin 250 is greater than or equal to about 475 mm. The diameter of the basin 250 may further be increased to any diameter, such as 500, 600, or 1000 mm, for example.

The basin 250 has a bottom surface 252 and sides 254 which are configured to hold a fluidic material. In one embodiment, the basin 250 is shaped so that the fluidic material flows towards the center of the basin 250 and is available to circulate up the cylinder 230 on the auger 240. In particular, the angle between the bottom surface 252 and the sides 254 is sufficiently large so that the melted chocolate flows towards the bottom surface 252 and the cylinder 230. Accordingly, because of the shape of the basin 250, pooling of melted chocolate on the bottom surface 252 is reduced and substantially all of the melted chocolate circulates through the fountain at a uniform rate. Because substantially all of the chocolate circulates through the fountain 200 at a uniform rate, the chocolate is more uniformly heated as it flows across the bottom surface 252 of the basin 250. In one embodiment, the angle between the bottom surface 252 and the sides 254 is greater than or equal to about 13 degrees. In another embodiment, the angle between the bottom surface 252 and the sides 254 is greater than or equal to about 16. The angle between the bottom surface 252 and the sides 254 may further be increased to 20, 25, 30, or 25 degrees, for example, to maintain the chocolate on the bottom surface 252 of the basin.

As noted above, the heating element 260 is advantageously encased in an aluminum enclosure. Because aluminum has a relatively high thermal conductivity, the aluminum enclosure provides a substantially uniform heating of the bottom surface 252 of the basin 250. In this way, the occurrence of hot spots, or locations that are heated more than others, is greatly reduced and the chocolate, or other fluidic material in the basin 250, is uniformly heated. In one embodiment, the aluminum enclosure is sandwiched between layers of another metal. For example, an aluminum enclosure may be covered, on a top and/or bottom surface, with stainless steel, thus providing a durable, easy to clean, and non-reactive surface for interaction with the chocolate and additionally providing the high thermal conductivity of the aluminum. Additionally, other metals with high thermal conductivity may be used to encase the heating element 260 in order to provide uniform heating of the basin 250. In another embodiment, an aluminum plate, rather than an enclosure, contacts the heating element 260 and the basin 250.

An auger 240 having a spiral flight 242 surrounding a central shaft of the auger 240 is coupled to the bottom surface 252 of the basin 250. A bottom end of the shaft 244 includes a connecting means configured to connect the shaft 244 with the motor 285 so that the motor 285 rotates the auger 240. In the embodiment of FIG. 2, the connecting means comprises a cross-rod 246 that connects with a gear driven by the motor 285. In one embodiment, the diameter of the auger 240, measured from the outer ends of the spiral flight 242, is substantially equal to the inner diameter of the cylinder 230. Thus, the auger 240 fits snuggly within the cylinder 230. As the motor 285 provides a rotational force causing the auger 240 to rotate, melted chocolate, for example, in the basin 250 is moved upwardly along the length of the cylinder 230, traveling upon the top surface of the spiral flight 242.

In an advantageous embodiment, the spiral flight 242 is angled so that the melted chocolate remains on the outer perimeter of the spiral flight 242. Additionally, in one embodiment, the spiral flight 242 has an increased pitch. These features are discussed in more detail below with reference to FIG. 6.

In one embodiment, the crown 210 is a single structure that is formed by metal casting or plastic molding, for example. Because the crown 210 is a single structure that does not require welding to fabricate, there are no welding artifacts, such as burrs or pits, on the crown 210. Accordingly, without the presence of welding artifacts that may accumulate chocolate, the chocolate is easily cleaned from the crown 210 and the crown 210 may be easily sanitized. In one embodiment, while the crown 210 extends over the top 232 of the cylinder 230, the crown 210 is casted so that the melted chocolate remains in an upper portion of the crown 210. As such, the crown 210 may be more easily cleaned than the crowns used in the prior art. These features are discussed in more detail below with reference to FIG. 3.

Exemplary chocolate fountain 200 includes three tiers 220 that are each attached to the cylinder 230. A top surface of each of the tiers 220 comes in contact with the melted chocolate that flows off the top circumference 212 of the crown 210 so that the melted chocolate flows over each of the tiers 220 and returns to the basin 250. More particularly, after the melted chocolate flows over the top circumference 212 of the crown 210, the chocolate drops to the top surface of the upper tier 220A. The melted chocolate then flows to an outer perimeter of the upper tier 220A and drops to a lower tier 220B. The melted chocolate next flows to an outside perimeter of lower tier 220B and drops to a base tier 220C. The melted chocolate then flows off of the base tier 220C and returns to the basin 250. The returning melted chocolate flows with the other melted chocolate in the basin 250 and returns to the bottom surface 252 of the basin so that it may again be heated and lifted through the cylinder 230 by the auger 240. In this way, the chocolate continues to circulate through the chocolate fountain 200 and creates levels of chocolate flowing like a waterfall.

Figure 3:
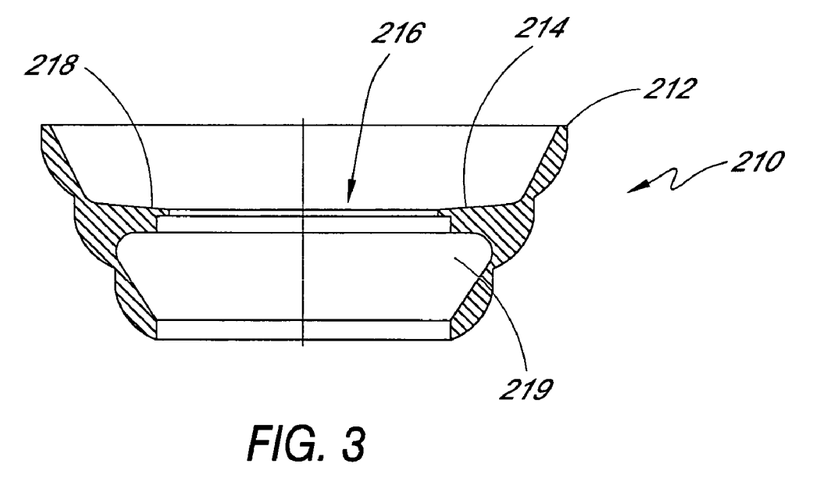
FIG. 3 is a cross-sectional side elevation view of a single structure crown.

FIG. 3 is a cross-sectional side view of the crown 210. The crown 210 includes an aperture 216, through which the cylinder 230 is extended in mounting the crown 210 on the cylinder 230. In one embodiment, the crown 210 is supported on the cylinder 230 by fingers 218 extending inwardly towards a center of the aperture 216. Thus, the fingers 218 of the crown 210 rest upon the top 232 of the cylinder 230. In one embodiment, the fingers 218 are extensions of the bottom surface 214, which covers a lower cavity 219. Because the finger 218 and the bottom surface 214 cover the lower cavity 219, the melted chocolate that flows out of the top 232 of the cylinder 230 onto the bottom surface 214 of the crown 210 does not enter the lower cavity 219. Therefore, cleaning is only required on the bottom surface 214 and sides of the crown 210. Additionally, in one embodiment the crown 210 is investment casted so that there are no weld junctions or burrs that increase the complexity of cleaning melted chocolate from the crown 210.

Figure 4A:
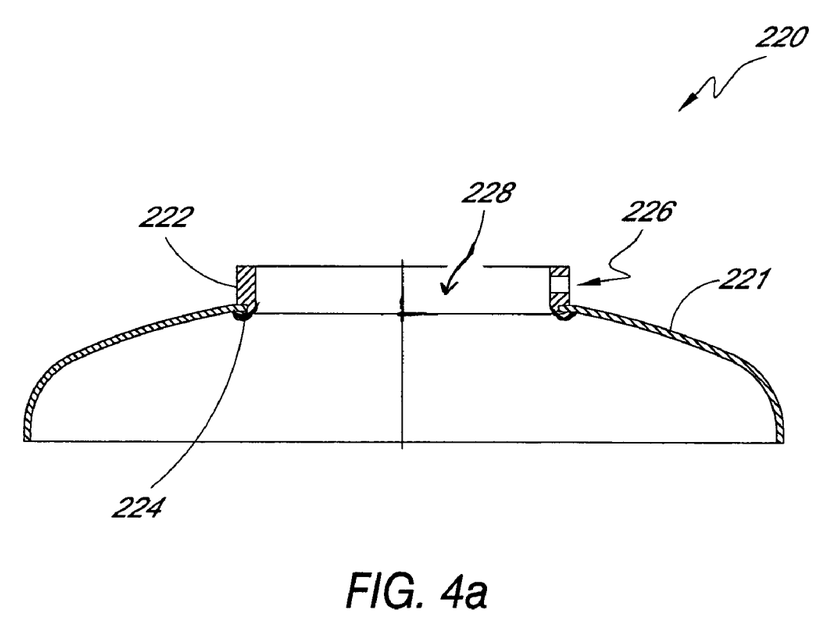
FIG. 4A is a cross-sectional side elevation view of a tier that may be attached to the cylinder to direct the flow of the melting chocolate.

FIG. 4A is a cross-sectional side view of a tier 220 that may be attached to the cylinder 230 to direct the flow of the melting chocolate. In one embodiment, the tier 220 is attached to the cylinder 230 through the use of a connector, inserted and tightened in a cavity 226 that extends through a side of the tier 230. More specifically, the aperture 228 of the tier 220 is first placed around the cylinder 230. The tier 220 is then lowered around the cylinder 230 until the desired position for the tier is reached. In one embodiment, the cavity 226 is threaded so that a bolt, such as a hex bolt, may be tightened through the cavity 226 against the outside of the cylinder 230. In this way the bolt holds the tier 220 in position on the cylinder 230. In one embodiment, the tier 220 includes multiple threaded cavities 226 that may be used to secure the tier 220 to the cylinder. Additionally, other types of attachment devices known in the art may be used to secure the tier 220 to the cylinder 230. In an embodiment using multiple tiers 220, such as that illustrated in FIG. 2, each tier 220 may have a predetermined position on the cylinder 230.

The exemplary tier 220 includes a collar 222 connected to the a body 221. In an advantageous embodiment, rather than welding the collar 222 to the body 221 (which would result in weld joints and burrs which increase the difficulty of cleaning each of the tiers 220) the collar 222 is flanged to the body 221. This process, described further below with respect to FIG. 5, flanges an extrusion of collar 222 forming flange 224 and mounting the collar 222 onto the body 221.

Figure 4B:
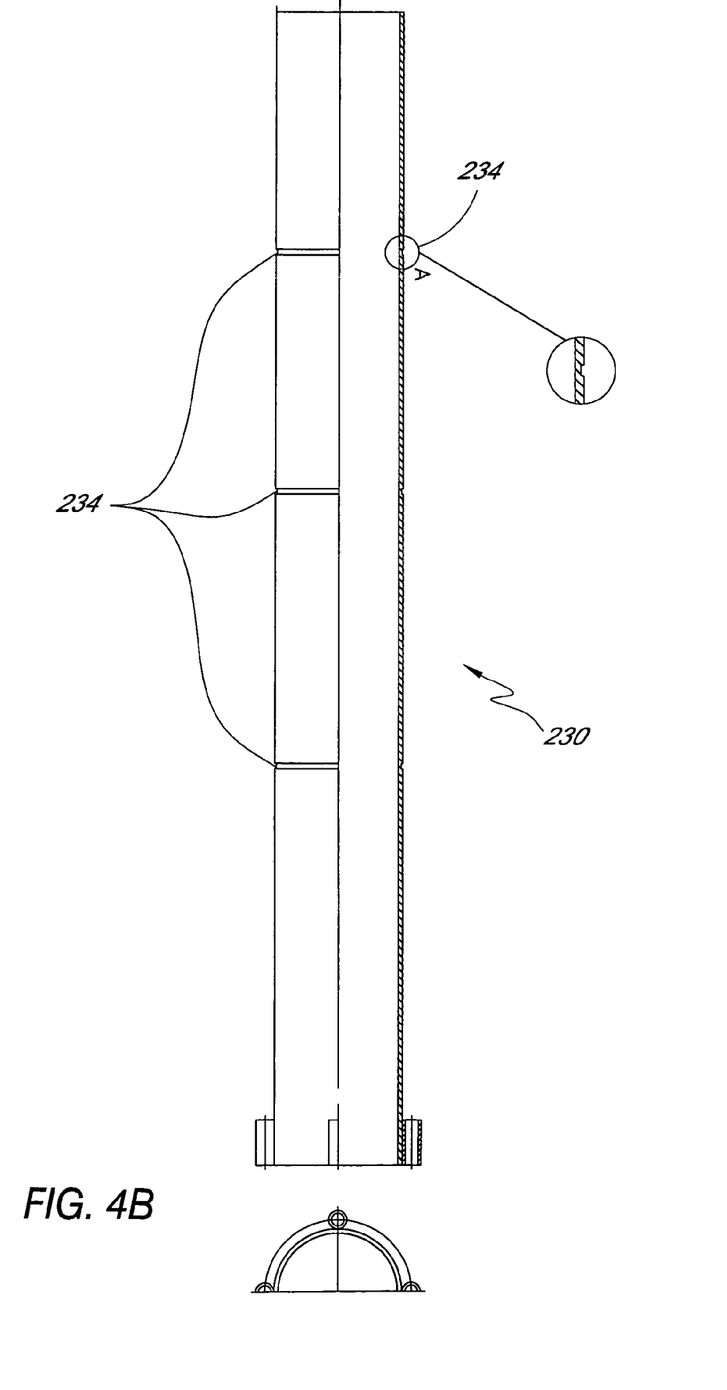
FIG. 4B is a cross-sectional side view of a cylinder including score marks indicating the recommended positions for placing the tiers.

FIG. 4B is a cross-sectional side view of a cylinder 230 including score marks 234 indicating predetermined positions for placing the tiers 220. In one embodiment, each of the score marks 234 extend around the entire perimeter of the cylinder 230. The score marks 234 advantageously allow the user to easily determine the appropriate position for each of the tiers 220. For example, a tier 220 may be lowered until the cavity 226 is aligned with a score mark 234, after which a bolt may be tightened so that the tier 220 is attached around the score mark 234. Also, the score marks 234 on the cylinder 230 advantageously allow the level placement of the tiers 220 without the need of leveling equipment. More particularly, the score marks 234 are placed parallel to the top 232 of the cylinder 230 so that tiers 220 are level when they are aligned with the score marks 234.

In one embodiment, the score marks 234 form a groove of sufficient depth to engage the tier 220 and provide a support for leveling the tier 220 on the cylinder 230. More particularly, the score marks 234 may be of sufficient depth so that as a tier 220 is moved over the score marks 234 the tier 220 engages with the score marks 234. In this way, the predetermined locations for each of the tiers 220 may be easily identified. In one embodiment, the attachment of the tiers 220 in a level orientation, such that the fluidic material flows evenly over the surface of the tiers 220, is also possible because of the interaction of the tiers 220 with the grooves of the score marks 234. For example, in one embodiment the tightening bolts may be tightened so that they extend through the cavity 226 of the tier into the groove of the score mark 234. Thus, attachment of the tiers 220 in a level orientation may be accomplished by simply attaching the tightening bolts so that they contact the score marks 234.

Figure 5:
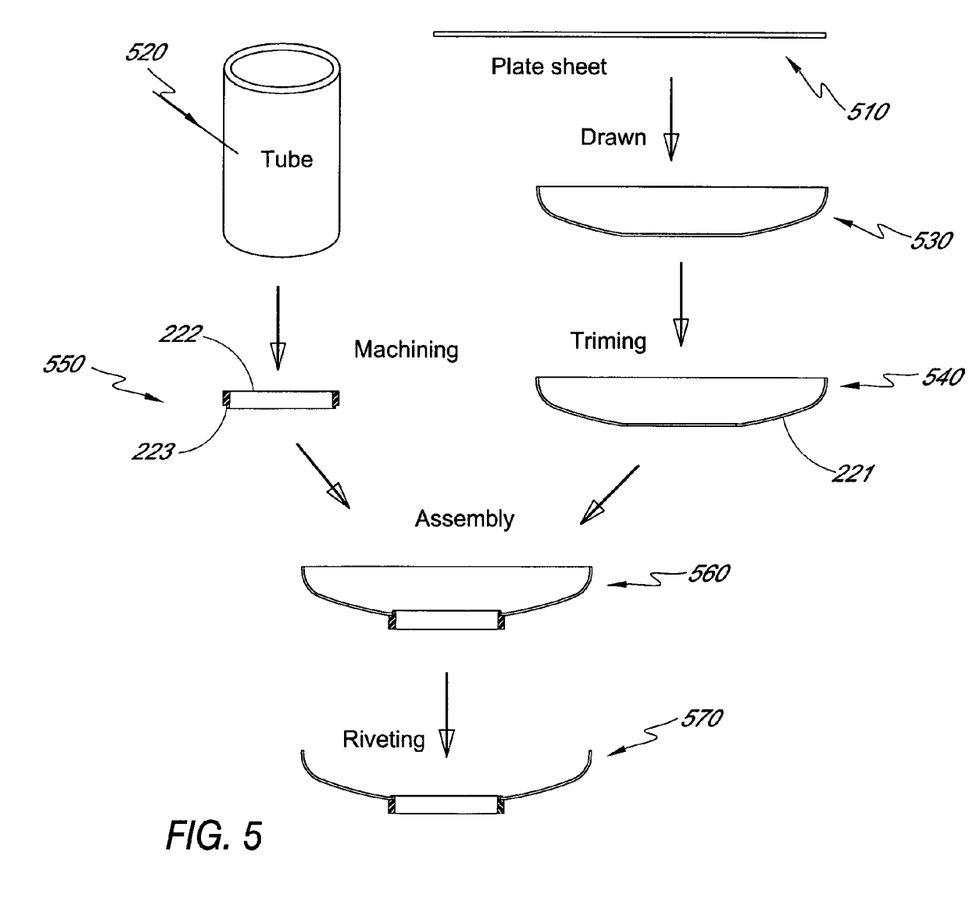
FIG. 5 is a pictoral flow diagram illustrating the assembly of a tier using a flanging, or riveting, process.

FIG. 5 is a pictoral flow diagram illustrating the assembly of a tier 220 using the above-described flanging, or riveting, process. In step 510, a plate sheet of metal is acquired to be formed into the body 221 of a tier 220. Through a drawing process, the plate sheet is shaped into a bowl shaped structure as shown at step 530. The bowl-shaped structure is then trimmed, as shown in step 540, to include an aperture 228, through which the collar 222 may be attached.

In step 520, a tube is provided for manipulation and use as the collar 222. At step 550, the collar 222 is formed by cutting the tube to the appropriate height and machining the tube so that a circular extrusion 223 extends from an inner circumference of the tube. The collar 222 and the body 221 are then assembled in step 560. In an advantageous embodiment, assembly comprises inserting the collar 220 into the aperture of the trimmed plate sheet so that the extrusions extend inside the body 221. In step 570, the extrusions are deformed so that they extend over a portion of the body 221, thus attaching the collar 222 to the body 221 without the use of welding. In one embodiment, the extrusions are pressed so that the junction between the extrusions and the body 221 is substantially smooth. In one embodiment, one or more spot welds may be applied to the junction between the extrusions and the body 221 in order to reinforce the connection between the body 221 and the collar 220. In this embodiment, the spot welds are applied to the side of the body 221 upon which melted chocolate does not flow over. Because the melted chocolate does not flow over the spot welds, the reinforcement of the connection between the body 221 and the collar 220 with spot welds does not increase the complexity of cleaning the fountain 200.

Figure 6:
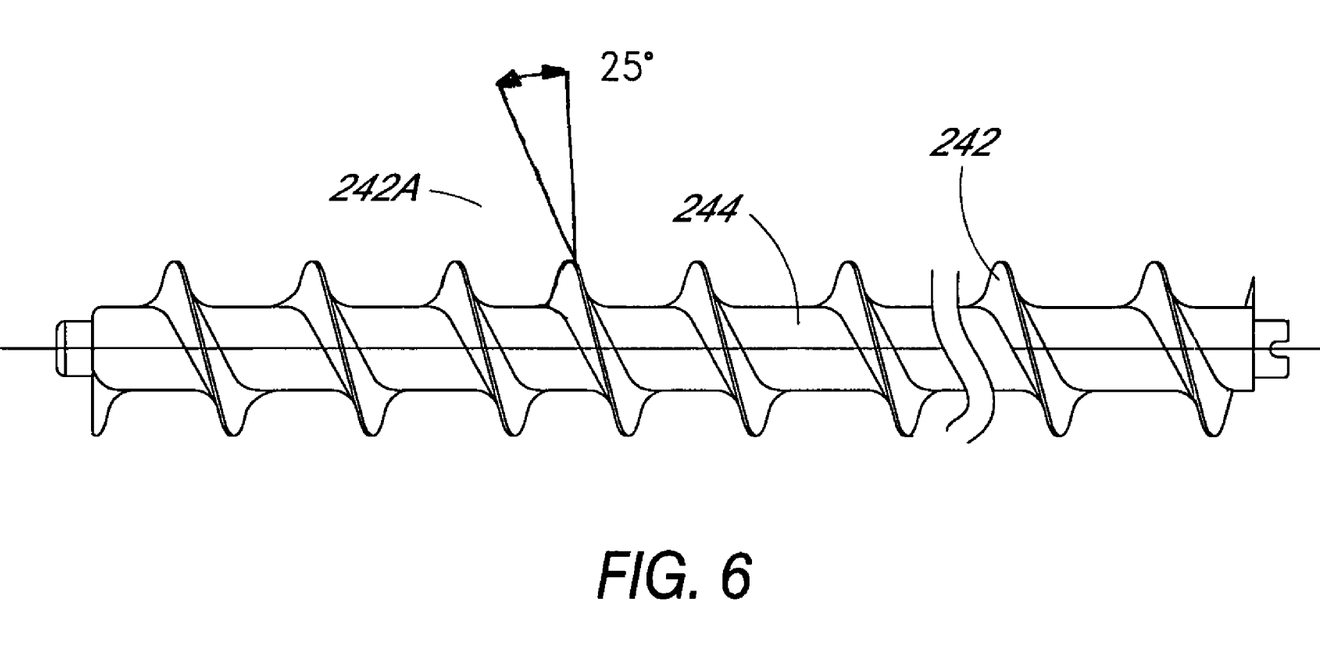
FIG. 6 is a side view of the auger, including a central shaft and a spiral flight.

FIG. 6 is side view of the auger 240, including central shaft 244 and spiral flight 242. As shown in FIG. 6, the incline angle of the spiral flight 242, as shown on revolution 242A, is about 25 degrees. The incline angle of the spiral flight 242 is selected so that the chocolate travels upwardly as the auger 240 rotates. In one embodiment, when the melted chocolate travels upwardly in the cylinder 230 on the surface of the spiral flight 242, the incline angle is such that the chocolate does not contact the shaft 244 of the auger 240. Because the chocolate does not contact the shaft 244, there is less surface area of the auger 240, including the shaft 244 between revolutions of the spiral flight 242, to clean after use of the chocolate fountain 200. Additionally, a distance (pitch) between revolutions of the flight 242 is increased so that the increased incline angle is possible.

In one embodiment, the auger 240 is plastic and is fabricated using a molding process, such as an injection molding process. In one exemplary embodiment, the auger 240 is insert molded. Because the auger 240 is made of plastic fabricated using a molding process, for example, there are no weld spots, pits, burrs on the auger 240. Accordingly, the number of non-smooth areas (that collect melted chocolate) on the auger 240 is reduced and the auger 240 is advantageously more easily cleaned than those in the prior art. Additionally, because the auger 240 is plastic, contact of the rotating auger 240 against the inner surface of the cylinder 230 does not create metal filings and prevents the auger 240 from becoming sharp and harmful to the user. Thus, the auger 240 advantageously reduces contamination caused by contact of the auger 240 with the cylinder 230. In other embodiments, the auger 240 comprises other materials that are easy to clean and/or reduce the occurrence of contaminants that are mixed into the fluidic material due to friction between the auger 240 and the cylinder 230.

Figure 7:
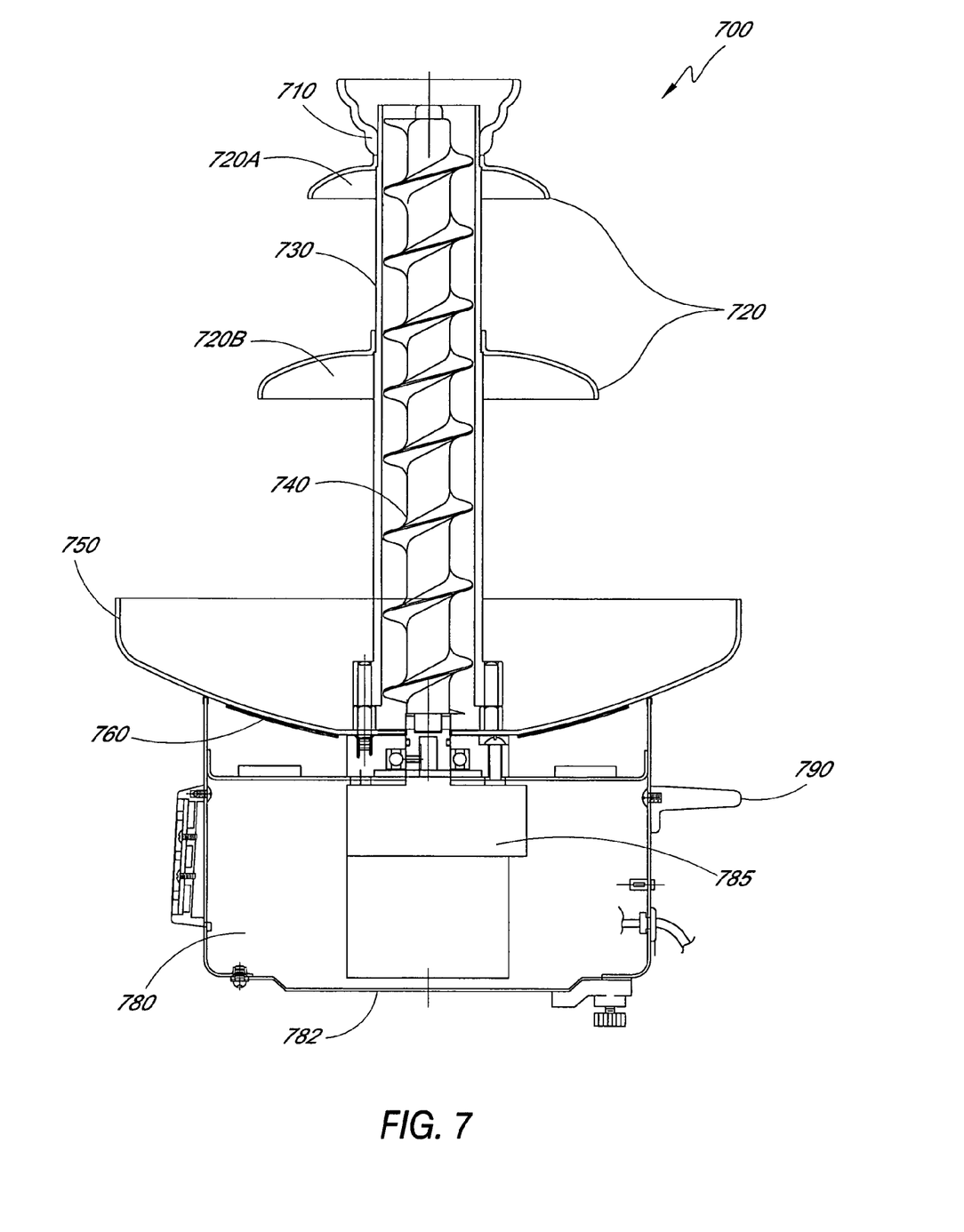
FIG. 7 is a cross-sectional side elevation view of another embodiment of a chocolate fountain.

FIG. 7 is a cross-sectional side view illustrating another embodiment of a chocolate fountain. The chocolate fountain 700 illustrated in FIG. 7 is smaller than the chocolate fountain 200 and, accordingly, may be more suitable for home use. The chocolate fountain 700 is advantageously easy to assemble, operate, and clean.

The fountain 700 includes a basin 750 mounted on a housing 780. In one embodiment, the basin comprises a material with a high thermal conductivity, such as aluminum, for example. Additionally, in one embodiment, an aluminum basin may be coated with one or more non-stick materials, such as teflon. As described further below with reference to FIG. 11, in one embodiment a flexible heater may be attached to the bottom of the basin 750. In this embodiment, because the basin 750 comprises a high thermal conductivity material, a power requirements of the flexible heater may be reduced.

As illustrated in FIG. 7, the housing 780 includes a bottom cover 782. In one embodiment, the bottom cover 782 includes an access panel that may be opened to access the inside of the housing 780. In this way, the components within the housing 780 may be easily accessed and repaired. In another embodiment, other portions of the fountain 700 include access panels that allow the user or technician to easily access and/or repair the components within the housing 780. The fountain 700 also includes one or more handles 790 that allows the user to easily move the entire fountain 700 or a portion of the fountain 700, such as the housing 780 and basin 750.

Similar to the chocolate fountain 200 discussed above, the fountain 700 includes a cylinder 730 attached to the basin 750 that houses an auger 740 configured to support a fluidic material as it is lifted upwardly through the cylinder 730. In the embodiment of FIG. 7, a motor 785 is mounted in the housing 780 so that the auger 740 is directly driven by the motor 785. Accordingly, the connection between the motor 785 and the auger 740 does not require additional gears or belts, reducing the number of parts required for the fountain 700.

Figure 8:
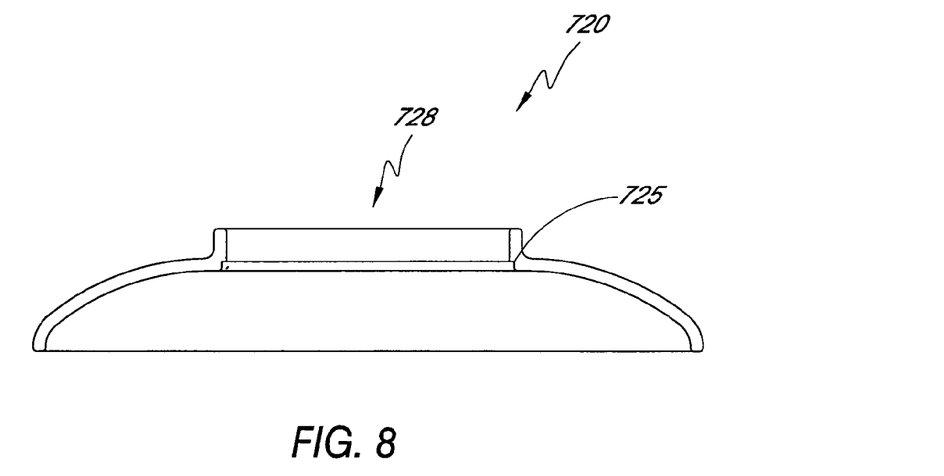
FIG. 8 is a cross sectional side elevation view of an exemplary tier that may be connected to the cylinder.

FIG. 8 is a cross sectional side view of an exemplary tier 720 that may be connected to the cylinder 730. The tiers 720 (including top tier 720A and bottom tier 720B) are mounted on the cylinder 730 and provide a surface on which the fluidic material may flow. For example, in one embodiment, the tiers 720 are metal and are fabricated according to the method described with respect to FIG. 5. Alternatively, as illustrated in FIG. 8, the tiers are a single structure, formed by metal casting, metal drawing, or plastic molding, for example. Accordingly, the tiers 720 do not require welding and, thus, do not have any welding artifacts, such as burrs or pits, that may retain melted chocolate and increase the complexity of cleaning the tiers 720. Also, the tiers 720 may be formed of plastic using a molding process, such as injection molding. While specific methods of manufacturing the tiers 720 are discussed above, it is expressly contemplated that the tiers 720 may be fabricated in any other way known in the art. The fountain 700 includes two tiers 720, namely tiers 720A and 720B. In other embodiment, the fountain 700 may be configured to support any number of tiers, such as 1, 3, 4, 5, or 6 tiers, for example.

As illustrated in FIG. 8, the tier 720 includes an aperture 728, through which the cylinder 730 is mounted. More particularly, the tier 720 is mounted on the cylinder 730 by first placing the tier 720 on the upper end 732 of the cylinder 730. The tier 720 is placed on the cylinder 730 so that the cylinder 730 extends through the aperture 728 of the tier 720. The tier 720 is then moved down the length of the tier 720 until the desired location for the tier 720 is reached. In one embodiment, each of the tiers 720, such as tiers 720A and 720B, have different diameters. For example, the chocolate fountain 700 (FIG. 7) illustrates the tier 720A having a smaller diameter than tier 720B. Additionally, the apertures 728 of tiers 720 may have different diameters. As discussed in detail below (FIG. 9), because the tiers 720 have apertures 728 of different diameters, the location of the tiers 720 on the cylinder 730 may be easily determined by simply sliding each tier 720 down the cylinder 730 until the tier 720 locks in to a predetermined location on the cylinder 730.

In one embodiment, the tier 720 includes a notch 725 on the inner surface of the tier 720. The notch 725 is configured to engage the cylinder 730 so that the tier 720 is supported on the cylinder 730 without the need for an additional tightening mechanism. In one embodiment, the notch 725 is molded as part of the tier 720. In another embodiment, the notch 725 is etched into the tier 720 after molding the tier 720.

Figure 9:
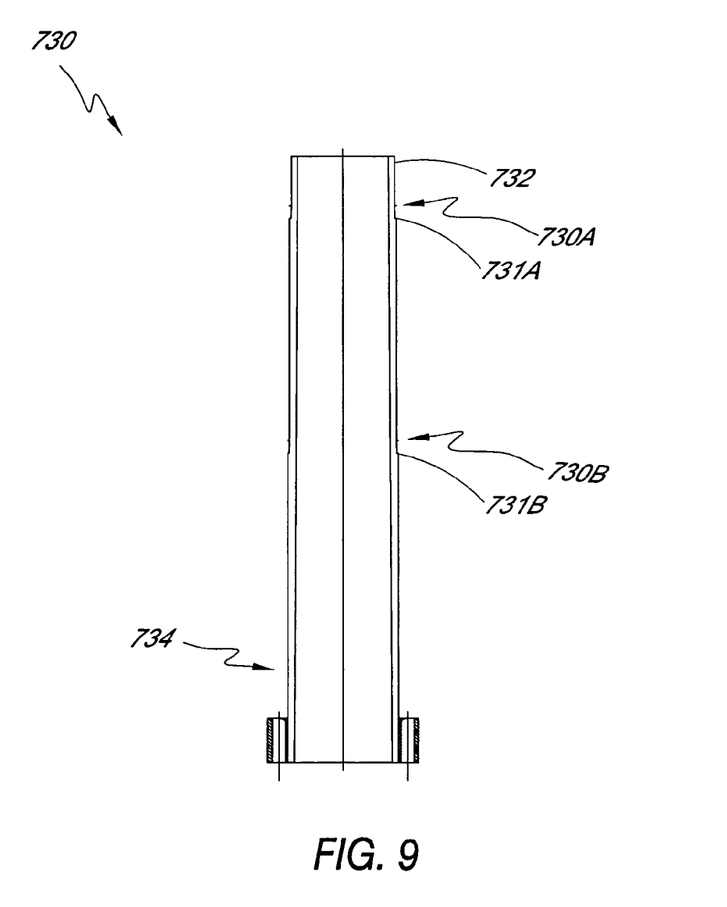
FIG. 9 is a cross-sectional side elevation view of a cylinder used to support the tiers.

FIG. 9 is a cross-sectional side view of a cylinder used to support the tiers 720. In one embodiment, the cylinder 730 is tapered so that a diameter of the upper end 732 of the cylinder 730 is smaller than a diameter of the lower end 734 of the cylinder 730. Because the cylinder 730 is tapered, tiers 720 having apertures 728 with different diameters will each fittingly engage the cylinder 730 at different positions of the cylinder 730. For example, in one embodiment, the bottom tier 720B has an aperture with a diameter that is substantially equal to a diameter of the cylinder 730 at position 730B. Accordingly, the tier 720B engages with the cylinder at position 730B so that the tier 720B is manually mounted on the cylinder 730. Similarly, the top tier 720A has an aperture with a diameter that is substantially equal to a diameter of the cylinder 730 at position 730A. Thus, the tier 720A engages with the cylinder at position 730A so that the tier 720A is manually mounted on the cylinder 730. In this way, the tiers 720 may be manually mounted on the cylinder 730.

In another embodiment, the cylinder 730 includes one or more ledges 731 configured to engage with tiers 720 in mounting the tiers 720 on the cylinder 730. In one embodiment discussed above, the tier 720 includes a notch 725 which is configured to engage with the ledge 731 in mounting the tier 720 on the cylinder 730. With reference to the cylinder 730 (FIG. 9), the ledge 731A has a larger diameter than ledge 731B. Accordingly, a tier 720 having an aperture with a diameter larger than the diameter of ledge 731A may be mounted at a lower location 730A, such as location 730B, on the cylinder 730.

Figure 10:
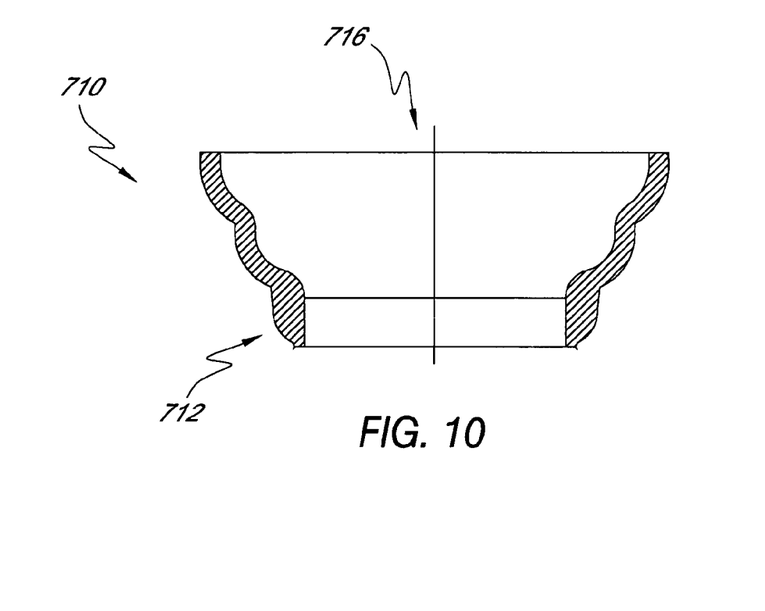
FIG. 10 is a cross-sectional side view of a crown configured for placement on the top of the cylinder.

FIG. 10 is a cross-sectional side view of a single structure crown 710 configured for placement on the top of the cylinder 730. The crown 710 includes an aperture 716 configured to fit over the upper end 732 of the cylinder 730. In one embodiment, the crown 710 is supported on the cylinder 730 by a tier 720, such as tier 720A (FIG. 7). As discussed above, the tiers 720, such as tier 720A, for example, may be mounted on the cylinder 730 using various mounting mechanisms. After the tier 720A, for example, is mounted on the cylinder 730, the tier 720A is stabilized and may support a further structure. Accordingly, the crown 710 may be positioned on the cylinder 730, with the aperture 716 surrounding the cylinder, so that a lower surface 712 of the crown 710 is supported by the tier 720A. In this way, the number of required parts needed to mount the crown 710 is reduced.

Figure 11:
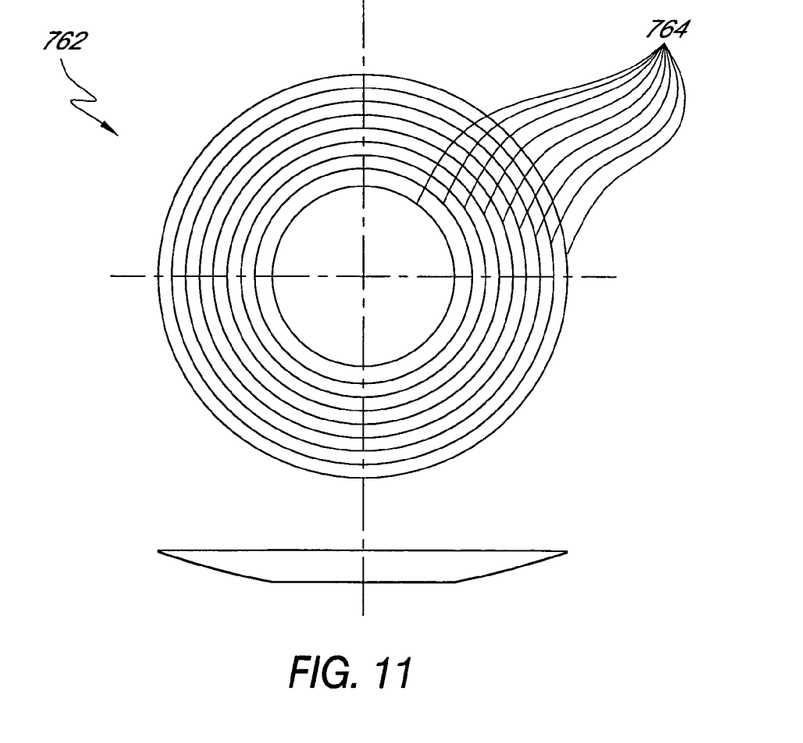
FIG. 11 is a top plan view of a flexible heater comprising a plurality of heating members.

FIG. 11 is a top view of a flexible heater 760 comprising at least one heating member 764. In one embodiment, the flexible heater 760 comprises multiple heating members 764. In the embodiment of FIG. 11, multiple heating members 764 are concentric, that is, each of the heating members 764 has a common center. In another embodiment, multiple heating members 764 are arranged in other configurations, such as in a web or a grid pattern, for example. In an advantageous embodiment, the flexible heater 760 is encapsulated in flexible heat conductive medium, such as rubber. For example, a filled rubber, such as a carbon filled rubber, may be used to encapsulate the flexible heater 750. Thus, the flexible heater 750 advantageously may be attached directly to a non-planar surface and provide substantially uniform heating of the surface. In an advantageous embodiment, each of the heating members 764 provides a heat source capable of transferring heat. The flexible heater is advantageously attached to the bottom of the basin 750 and provides substantially uniform heating of the basin 750. In this way, the occurrence of hot spots, or locations that are heated more than others, is greatly reduced and the chocolate, or other fluidic material in the basin 750, is uniformly heated.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. An apparatus comprising:
    a basin having a bottom surface and an outer side surrounding said bottom surface, said basin being configured to contain a fluidic material within said basin;
    a heating element configured to substantially evenly heat said bottom surface of said basin;
    a cylinder having a top end and a bottom end, wherein said bottom end is attached to said bottom surface of said basin so that said cylinder extends substantially perpendicular from said bottom surface;
    an auger having a spiral flight comprising a plurality of revolutions protruding along a length of said auger, wherein said auger is disposed within said cylinder;
    a tier comprising a collar portion, a body portion, and a notch between the junction of the collar portion and the body portion, wherein said cylinder comprises a step of sufficient size so that the step engages the notch and supports said tier on the cylinder; and
    a source of rotation coupled to said auger and configured to rotate said auger inside said cylinder, wherein said spiral flight supports said fluidic material as said auger rotates, moving said fluidic material upwardly to said top end of said cylinder.

2. The apparatus of claim 1, wherein said fluidic material flows from said top end of said cylinder onto said upper surface of said tier and flows downwardly to said basin.

3. The apparatus of claim 1, wherein said tier is bowl shaped so that an outer perimeter of said tier is curved towards said basin.

4. The apparatus of claim 1, wherein said high thermal conductivity enclosure comprises aluminum.

5. The apparatus of claim 1, wherein said revolutions of said spiral flight have a pitch of greater than about 55 mm.

6. The apparatus of claim 1, wherein said revolutions of said spiral flight have a pitch of less than about 24 mm.

7. The apparatus of claim 1, wherein said cylinder comprises a score mark at a predetermined height of said cylinder and extending around an outer perimeter of said cylinder, and wherein said tier is attached to said cylinder at said predetermined height of said cylinder.

8. The apparatus of claim 7, wherein said score mark is of a sufficient depth so that said tier engages said score mark, and wherein said engagement of said tier with said score mark allows the attachment of said tier on said cylinder so that said fluidic material flows uniformly on a top surface of said tier.

9. The apparatus of claim 1, wherein said fluidic material comprises melted chocolate.

10. The apparatus of claim 1, wherein said source of rotation comprises an electric motor.

11. The apparatus of claim 10, wherein said electric motor is mounted so that a drive shaft rotates parallel to said auger and wherein a belt is coupled to said drive shaft and said auger so that said drive shaft rotates said auger.

12. The apparatus of claim 10, wherein said electric motor is mounted so that a drive shaft directly engages said auger so that said drive shaft rotates said auger.

13. The apparatus of claim 1, wherein said tier comprises a collar including a step on a top surface of said collar and a body having an aperture, wherein said step of said collar is inserted into said aperture and said step is deformed so that said collar is attached to said body.

14. The apparatus of claim 13, wherein, on said lower surface of said tier, a spot weld is applied to a junction of said collar and said body.

15. The apparatus of claim 13, wherein said tier is removably attached to said cylinder using a hex bolt tightened through a threaded hole in said collar.

16. The apparatus of claim 1, wherein said tier comprises a single structure.

17. The apparatus of claim 1, wherein said auger comprises a FDA plastic material.

18. The apparatus of claim 1, wherein said auger comprises a non-metallic material.

19. The apparatus of claim 1, wherein said auger is fabricated by insert molding.

20. The apparatus of claim 1, wherein an angle between said bottom surface of said basin and said outer perimeter is less than or equal to about 14 degrees.

21. The apparatus of claim 1, wherein an angle between said bottom surface of said basin and said outer side is greater than or equal to about 16 degrees.

22. The apparatus of claim 1, wherein a diameter of said outer perimeter is greater than or equal to about 475 mm.

23. The apparatus of claim 1, wherein a diameter of said outer perimeter is less than or equal to about 350 mm.

24. The apparatus of claim 1, further comprising a crown mounted on said top end of said cylinder, wherein said fluidic material flows from said top end of said cylinder onto said crown and then onto said upper surface of said tier.

25. The apparatus of claim 24, wherein a surface of said crown on which said fluidic material flows is substantially free of welding artifacts.

26. The apparatus of claim 24, wherein said crown is fabricated by metal casting.

27. The apparatus of claim 24, wherein said crown is fabricated by plastic molding.

28. The apparatus of claim 24, wherein said crown comprises a single structure.

29. The apparatus of claim 24, wherein said crown is mounted on said top end of said cylinder so that a portion of said crown extends below said top end of said cylinder, and wherein said crown is configured so that said fluidic material does not contact said portion of said crown that extends below said top end of said cylinder.

30. The apparatus of claim 1, further comprising a second tier mounted on said cylinder, wherein said fluidic material flows on an upper surface of said second tier.

31. The apparatus of claim 30, further comprising a third tier mounted on said cylinder, wherein said fluidic material flows on an upper surface of said third tier.

32. The apparatus of claim 1, further comprising a handle mounted on said basin.

33. The apparatus of claim 1, wherein said auger, said crown, and said tier are free of welding artifacts.

34. The apparatus of claim 1, wherein said tier is free of welding artifacts on said upper surface.

35. A fountain comprising:
a basin configured to contain a fluidic material, wherein a diameter of an outer perimeter of said basin is greater than or equal to about 475 mm;
a housing removably attached substantially perpendicular to said basin and configured to contain said fluidic material; and
a moving means configured to move said fluidic material within said basin upwardly within said housing, wherein substantially all of said fluidic material returns to said basin, via a path outside of said housing, after said moving means moves said fluidic material to a top of said housing.

36. A fountain comprising:
a basin configured to contain a fluidic material;
a housing removably attached substantially perpendicular to said basin and configured to contain said fluidic material; and
a plastic auger configured to move said fluidic material within said basin upwardly within said housing, wherein substantially all of said fluidic material returns to said basin, via a path outside of said housing, after said plastic auger moves said fluidic material to a top of said housing.

37. A fountain comprising:
a basin configured to contain a fluidic material;
a housing removably attached substantially perpendicular to said basin and configured to contain said fluidic material; and
a single structure crown mounted on said top end of said housing, wherein said fluidic material travels upwardly to said top end of said housing, onto said crown, and then downwardly towards said basin, wherein said crown is fabricated by plastic molding.

* * * * *